No. 841,912. PATENTED JAN. 22, 1907.
H. W. WÜRTH.
VEHICLE WHEEL.
APPLICATION FILED OCT. 18, 1904.
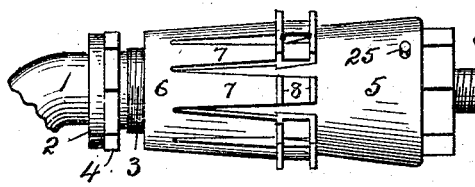
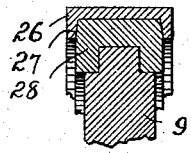
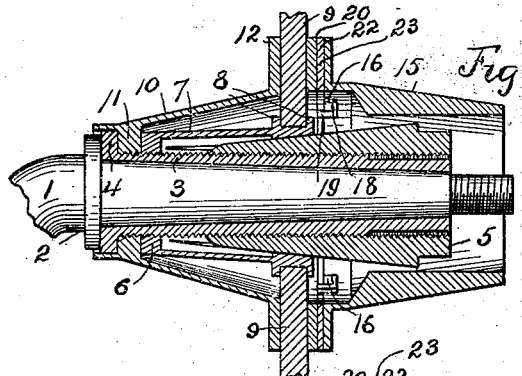
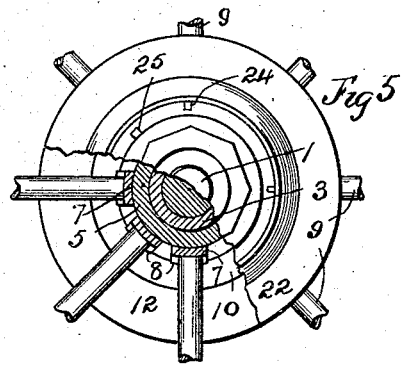
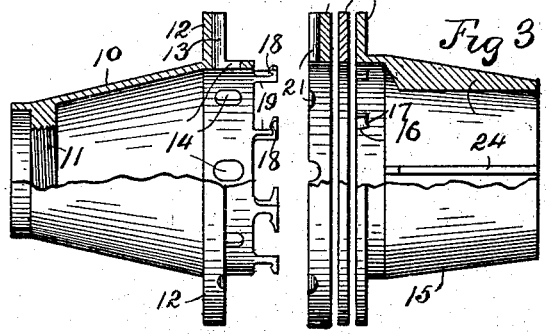
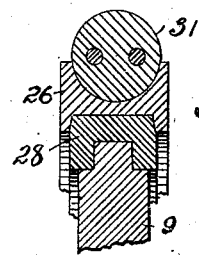
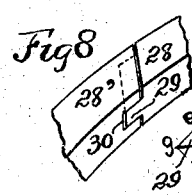
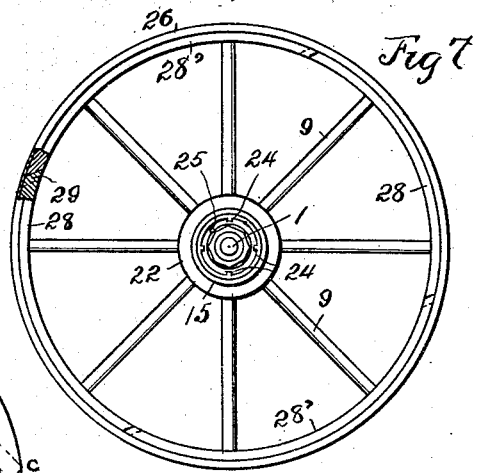
Witnesses:
R. E. Hamilton.
F. C. Priestly
Inventor,
Henry W. Würth,
By Warren D. House,
His Attorney.

UNITED STATES PATENT OFFICE.

HENRY W. WÜRTH, OF LEEDS, MISSOURI.

VEHICLE-WHEEL.

No. 841,912.      Specification of Letters Patent.      Patented Jan. 22, 1907.

Application filed October 18, 1904. Serial No. 228,979.

*To all whom it may concern:*

Be it known that I, HENRY W. WÜRTH, a citizen of the United States, residing at Leeds, in the county of Jackson and State of Missouri, have invented certain new and useful Improvements in Vehicle-Wheels, of which the following is a specification.

My invention relates to improvements in vehicle-wheels.

The object of my invention is to provide a vehicle-wheel in which the felly-sections are held in position by radially-adjustable spokes, an expansible hub being employed to force the spokes against the felly-sections.

My invention provides, further, a tire with an inner groove to receive the felly-sections, the felly-sections being provided with overlapping ends so arranged that the felly-sections may be readily inserted in position in the inner groove of the tire.

I provide, further, a novel form of joint by which lateral movement of the felly-sections relatively to each other is prevented.

Other novel features are hereinafter fully described and claimed.

In the accompanying drawings, illustrative of my invention, Figure 1 is a side elevation view of the expansible hub shown mounted on the axle, the casing being omitted. Fig. 2 is a central longitudinal sectional view of the hub and inner ends of the spokes. Fig. 3 is a view of the hub-casing, shown partly in vertical section and partly in elevation, the several parts being detached from each other. Fig. 4 is a cross-section of the tire, one of the felly-sections, and the outer end of a spoke. Fig. 5 is an end view of the hub, shown partly in elevation and partly in vertical section. Fig. 6 is a cross-section of one of the felly-sections, the outer end of a spoke, a rubber tire, and an iron tire having the inner and outer grooves to receive, respectively, the felly-sections and rubber tire. Fig. 7 is a side elevation view of a wheel having embodied in it the novel features of my invention, a part of the felly-sections and tire being shown in section at a point where two felly-sections join. Fig. 8 is a perspective view of the abutting ends of two felly-sections. Fig. 9 is a side elevation view of one of the felly-sections.

Similar characters of reference denote similar parts.

1 denotes the axle provided with a flange 2. On the axle is rotatively mounted a sleeve 3, externally screw-threaded and provided at its inner end with a flange 4 of polygonal form. A cone or conical member 5 is provided with a screw-threaded hole fitted to the sleeve 3. The outer end of the cone may have a polygonal form for being gripped by a wrench. Encircling the sleeve 3 is an annular member 6, preferably having a threaded inner periphery fitted to the sleeve and having a series of radially-movable arms 7 of more or less flexibility and adapted to rest at their outer ends upon the tapering surface of the cone 5.

Each arm 7 has on its outer side at its outer end two transverse flanges 8, which form a recess adapted to receive therein the inner end of a spoke 9, which recess holds the inner end of the spoke against lateral movement in a direction parallel with the said arm 7. By rotating the cone 5 the arms 7 are forced outwardly, thus forcing outward the spokes 9. The ordinary axle-nut (not shown) is mounted on the outer threaded end of the axle 1 and retains the sleeve 3 in position. To protect the inner parts and to support the spokes 9 and hold them rigidly in position and also to lock the conical member 5 on the sleeve, the following-described casing is employed. An inner conical tubular member 10 has an inner flange threaded to fit the sleeve 3 and denoted by 11 and disposed between the flange 4 and member 6. The outer end of the member 10 has a peripheral flange 12, having a series of radial recesses 13 in line with a series of radial holes 14, adapted to receive the spokes 9. The outer end of the member 10 is insertible in the inner end of a tubular member 15, having on its inner periphery a series of projections 16, adapted to receive each in a recess 17 at its outer end the inwardly-extending projection 18 on the the outer end of a hook 19, of which a series are provided on the outer end of the member 10.

Encircling the member 10 outside the flange 12 is a ring 20, having a series of radial recesses 21, adapted to receive the spokes 9. On the inner end of the member 15 is provided a flange 22, adapted to bear against a resilient ring 23, which bears against the outside of the ring 20. The function of the ring 23 is to force the member 15 outwardly, so that the projections 18 on the hooks 19 will remain in the recesses 17. On the inner periphery of the member 15 are provided a number of longitudinal flanges 24, adapted to receive between them a peripheral pin or projection 25 on the cone 5. The flanges 24 serve to limit the rotation of the cone 5 after it has been adjusted.

In assembling the parts the member 15 is not placed in position until the cone 5 has been rotated to a position in which the spokes are properly positioned. The member 15 is then engaged with the member 10 by means of the hooks 19 and projections 16, the resilient ring 23 forcing the projections 18 into the recesses 17.

The tire 26 is provided on its inner periphery with a groove 27, adapted to receive the felly-sections 28 and 28'. Suitable radial holes are provided in the inner sides of the felly-sections to receive the outer ends of the spokes 9. On each end of each of the two felly-sections 28 is provided a tongue 29, adapted to enter a groove 30, provided one in each end of the two felly-sections 28', which felly-sections are disposed alternately between the felly-sections 28. The felly-sections are cut off obliquely at their ends, preferably at an angle of about forty-five degrees from diametrical lines intersecting the joints between the felly-sections, the two tongues of each felly-section being cut parallel with each other and parallel with a diametrical line radially dividing the felly-section. The grooved ends of the felly-sections 28' are cut diverging from each other and to fit the ends of the adjacent felly-sections 28. By this construction after all the felly-sections but one have been placed in the grooved tire the last felly-section may be readily slipped into position, the beveled joint permitting such insertion. After the felly-sections and other parts have been assembled as described the spokes may be radially adjusted so as to force the felly-sections tightly into the tire by rotation of the cone 5 in the proper direction. The felly-sections having overlapping ends, lateral movement relative to each other is prevented even when the felly-sections do not fit closely together at their ends.

In Fig. 9 is shown a felly-section provided with the tongues 29. The distance should not be greater between the points $a\ c$ than between the points $b\ d$, and the distance between the points $e\ f$ should not be greater than the distance between the points $g\ h$. So constructed the felly-section will slip readily into position. If desired, all the joints may be cut radially or in diametrical lines, excepting one joint, which should be cut, as hereinbefore described, at an angle to the diametrical line intersecting the joint, the groove and tongue of such joint being cut as described. So constructed the felly-section having the tongue cut at an angle should be inserted last.

My invention may be variously modified without departing from its spirit.

Having thus described my invention, what I claim, and desire to secure by Letters Patent, is—

1. In a vehicle-wheel, the combination with the sleeve adapted to be mounted on the axle, of a cone adjustable longitudinally on the sleeve, a member carried by the sleeve and having a plurality of radially-swinging arms provided with recesses, the spokes resting upon said arms and in said recesses, the tire, and a plurality of felly-sections mounted in the tire and supported by the spokes.

2. In a vehicle-wheel, the combination with the sleeve adapted to be mounted on the axle, of a cone adjustable lengthwise on the sleeve, a member carried by the sleeve and having a plurality of swinging arms having each a recess adapted to rest on the cone, the spokes resting upon said arms in said recesses, a tire having an inner peripheral groove, and a plurality of felly-sections mounted in said groove and supported by the spokes.

3. In a vehicle-wheel, the combination with the externally-screw-threaded sleeve adapted to be mounted on the axle, of a cone having a longitudinal hole provided with threads fitted to the threaded part of the sleeve, a member carried by the sleeve and having a plurality of swinging arms resting upon the cone and having each a recess, the spokes resting upon said arms and in said recesses, a tire having an inner groove and a plurality of felly-sections mounted in said groove and supported by the spokes.

4. In a vehicle-wheel, the combination with the sleeve adapted to be mounted on the axle, of a cone longitudinally movable on the sleeve, a member carried by the sleeve having a plurality of swinging arms having each a recess, the spokes supported by said arms and in said recesses, the tire, and a plurality of felly-sections mounted in the tire, having a tongue-and-groove connection with each other and supported by the spokes.

5. In a vehicle-wheel, the combination with the sleeve adapted to be mounted on the axle, of a cone longitudinally adjustable on the sleeve, a member carried by the sleeve having a plurality of radially-swinging arms resting upon the cone and having each a recess, the spokes resting upon said arms and in said recesses, the tire, and a plurality of felly-sections having overlapping ends, each felly-section end being cut at an angle to a diametrical line intersecting said end, the felly-sections being located in the tire and supported by the spokes.

6. In a vehicle-wheel, the combination with the sleeve adapted to be mounted on the axle, of a cone longitudinally adjustable on the sleeve, a member carried by the sleeve and having a plurality of radially-swinging arms resting upon the cone and having each a recess, the spokes resting upon said arms and in said recesses, a tire having an inner peripheral groove, and a plurality of felly-sections mounted in said groove and supported by said spokes, the felly-sections having a tongue-and-groove connection with each other, and the abutting ends of two of said felly-sections being cut at an angle to a diametrical line intersecting said abutting ends.

In testimony whereof I affix my signature in presence of two witnesses.

HENRY W. WÜRTH.

Witnesses:
 WARREN D. HOUSE,
 HENRY F. ROSE.